US006235801B1

(12) United States Patent
Morales et al.

(10) Patent No.: US 6,235,801 B1
(45) Date of Patent: May 22, 2001

(54) METHOD OF EXPANDING A GEL MATERIAL

(76) Inventors: Miguel A. Morales, 4881 Montague Ave., Fremont, CA (US) 94555; Mark W. Ellsowrth, 7200 Prince Dr., Dublin, CA (US) 94568; James A. Rinde, 666 Mission Creek, Fremont, CA (US) 94539; Barry C. Mathews, 5265 Fairbanks Common, Fremont, CA (US) 94555

(*) Notice: Subject to any disclaimer, the term of this patent is extended or adjusted under 35 U.S.C. 154(b) by 0 days.

(21) Appl. No.: 09/285,414

(22) Filed: Apr. 2, 1999

(51) Int. Cl.⁷ .................................. C08J 9/32; B01J 13/02
(52) U.S. Cl. ................................................ 521/54; 521/154
(58) Field of Search ........................................ 521/54, 154

(56) References Cited

U.S. PATENT DOCUMENTS

| | | | |
|---|---|---|---|
| 3,020,260 | 2/1962 | Nelson | 260/46.5 |
| 3,615,972 | 10/1971 | Morehouse, Jr. et al. | 156/79 |
| 3,821,128 | 6/1974 | Garner | 260/2.5 B |
| 3,945,956 | 3/1976 | Garner | 260/2.5 B |
| 4,075,134 | 2/1978 | Morehouse, Jr. et al. | 260/29.6 RW |
| 4,075,138 | 2/1978 | Garner | 260/2.5 B |
| 4,108,806 | 8/1978 | Cohrs et al. | 521/54 |
| 4,179,546 | 12/1979 | Garner et al. | 521/56 |
| 4,397,799 | 8/1983 | Edgren et al. | 264/53 |
| 4,600,261 | 7/1986 | Debbaut | 339/116 C |
| 4,634,207 | 1/1987 | Debbaut | 339/116 C |
| 4,686,244 * | 8/1987 | Dietlein et al. | 521/154 |
| 4,777,063 | 10/1988 | Dubrow et al. | 427/44 |
| 4,861,804 | 8/1989 | Nakanishi | 521/54 |
| 5,079,300 | 1/1992 | Dubrow et al. | 525/106 |
| 5,155,138 | 10/1992 | Lundquist | 521/76 |
| 5,357,157 | 10/1994 | Debbaut | 174/84 R |
| 5,520,961 | 5/1996 | Lysell et al. | 427/385.5 |
| 5,585,119 | 12/1996 | Petersen et al. | 425/4 C |

FOREIGN PATENT DOCUMENTS 0 336 001 A1    10/1989   (EP) .

OTHER PUBLICATIONS

International Search Report for International Application No. PCT/US00/08834 dated Jun. 27, 2000.
Akzo Nobel, brochure entitled "Introduction to Exancel® Microspheres" 1997.
Derwent Abstract WPI 86–170974/198627 (abstract of JP 05–279569 (1993)(Suzuki Sogyo KK).
Derwent Abstract WPI 92–069535/199209 (abstract of JP 04–031766 (1992)(Shigel KK)).
Derwent Abstract WPI 93–374761/199347 (abstract of JP 05–279637 (1993)(Nitto Denko Corp)).
Derwent Abstract WPI 95–332744/199543 (abstract of JP 07–228860 (1995)(Nichiban KK)).
Derwent Abstract WPI 97–347566/199732 (abstract of JP 09–143309 (1997)(Mitsuboshi Belting Ltd.)).

* cited by examiner

*Primary Examiner*—Morton Foelak

(57) ABSTRACT

A gel material is expanded by first subjecting mixture of a gel precursor material and heat-expandable microspheres to a curing regimen which cures the precursor material into a gel material without expanding the microspheres and then heating to expand the gel material containing the microspheres. In this manner, an intermediate product in the form of a gel which is more handleable than the typically syrupy precursor material is produced. This intermediate product can be manipulated and placed at the intended application location and then expanded.

8 Claims, 4 Drawing Sheets

METHOD OF EXPANDING A GEL MATERIAL

BACKGROUND OF THE INVENTION

1. Field of the Invention

Figure 1:
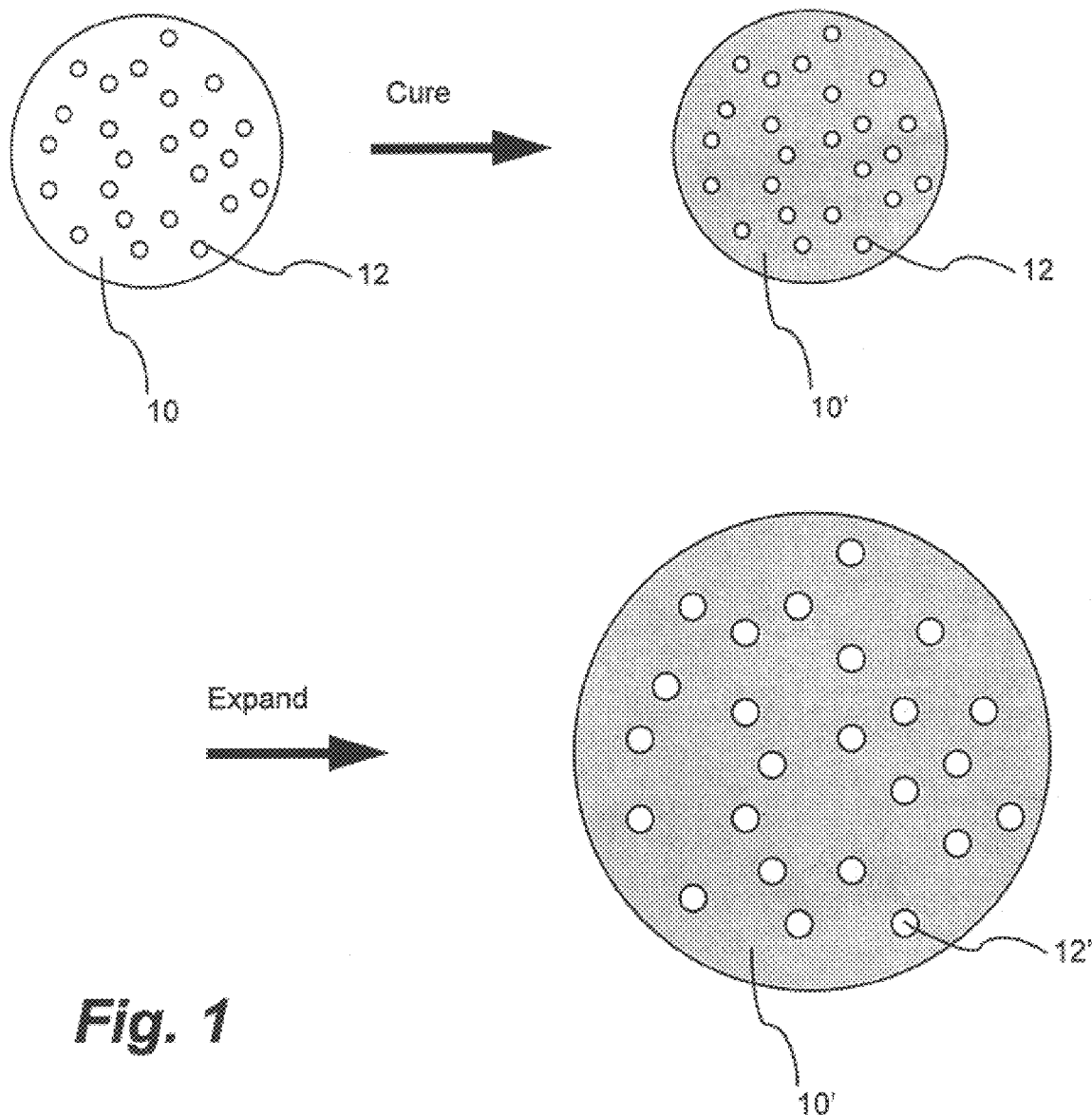

This invention relates to a method of expanding a gel material.

2. Description of Related Art

Gels have been used for a variety of applications, such as sealing, encapsulation, acoustic isolation or damping, insulation, and the like. Properties which make gels valuable in such applications include their conformability, adhesion to a wide variety of materials, and re-enterability.

Because of their tackiness, gels can be difficult to handle. For certain applications, it may be desirable to be able to place the gel more or less at its final desired location, and then expand the gel to its full void-filling or gap-bridging size.

Thus, it would be desirable to have a gel material which can first be emplaced in its use location, and then be expanded to its final location.

BRIEF SUMMARY OF THE INVENTION

This invention provides method of expanding a gel material, comprising the steps of:

(a) providing a mixture comprising a curable gel precursor material and a plurality of heat-expandable microspheres, the gel precursor material being curable into a gel material having a tensile strength of no greater than about 150 psi upon subjection to a curing condition and the microspheres being expandable upon heating to a expansion temperature, the pre-determined curing condition not causing the expansion of the microspheres;

(b) subjecting the mixture to the curing condition to cure the gel precursor material into a gel material having a tensile strength of no greater than about 150 psi and containing the microspheres; and (c) heating the gel material containing the microspheres to the expansion temperature, causing the microspheres to expand and thereby also causing the expansion of the gel material.

BRIED DESCRIPTION OF THE DRAWING(S)

FIG. 1 shows schematically the method of this invention.

FIGS. 2, 3, 4 and 5 plot volume expansion (%) as a function of expansion time, ultimate elongation of the gel material, tensile strength of the gel material, and weight % of microspheres, respectively.

DETAILED DESCRIPTION OF THE INVENTION

Generally, a mixture of a precursor of the gel material and heat-expandable microspheres (also known as microballoons) is prepared, so that the microspheres are dispersed in the precursor. The precursor is subjected to a pre-determined curing condition which causes the precursor to cure into the gel material but which does not cause the microspheres to expand, forming an intermediate product which is a gel material containing as-yet unexpanded microspheres. This intermediate product is more handleable than the precursor material, which typically is a syrupy liquid, and can be positioned substantially at its final intended location, without its running or dripping. Then, the gel material is heated to a temperature equal to or exceeding the expansion temperature of the microspheres, causing the latter to expand. Consequently, the gel material as a whole also expands, by between 10 and 50 volume %, preferably between 40 and 50 volume % in a partially constrained setting such as an open container. (The free volume expansion can be over 300%).

The method of this invention is illustrated schematically in FIG. 1. Heat expandable microspheres 12 are dispersed in a precursor 10 of a gel material. Upon subjection to cure conditions, precursor 10 is converted to a gel material 10', containing dispersed therein as-yet unexpanded microspheres 12. Upon heating to the expansion temperature of microspheres 12, they expand to form expanded microspheres 12', causing the overall expansion of gel material 10'.

In one embodiment, the curing condition is heating the precursor to a curing temperature which is lower than the expansion temperature of the microspheres, so that the precursor cures to the gel material, but the microspheres are left unexpanded (until a subsequent subjection to the higher expansion temperature). Typically, commercially available plastic microspheres have expansion temperatures between 80 and 150° C., so that curing temperatures will, correspondingly, be between room temperature and 60° C. for compositions having microspheres with low expansion temperatures and about 90° C. for compositions having microspheres with high expansion temperatures. The curing times will be on the order of between 5 and 60 min. The expansion times are typically between 5 and 60 min, with about 15 min being typical.

In another embodiment, the precursor is photochemically curable, so that the curing condition is irradiation with ultraviolet light.

In yet another embodiment, the curing condition is simply the passage of time, because the gel material (e.g., a silicone gel curable by platinum catalyst chemistry) is a room-temperature curing material.

Those skilled in the art will understand that the curing condition may be a combination, for example the introduction of a chemical catalyst combined with heating. In the art of gel materials, it is possible to formulate precursor compositions curing under a variety of different regimens, depending on the intended application.

Preferably, the gel material comprises silicone gel, more preferably a crosslinked silicone gel based on polydimethylsiloxane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Combination systems are possible. Suitable examples of either of these gel systems are taught in, inter alia, Debbault, U.S. Pat. No. 4,600,261 (1986); Debbault, U.S. Pat. No. 4,634,207 (1987); Debbault, U.S. Pat. No. 5,357,057 (1994); Dubrow et al., U.S. Pat. No. 5,079,300 (1992); Dubrow et al., U.S. Pat. No. 4,777,063 (1988); and Nelson, U.S. Pat. No. 3,020,260 (1962); all incorporated herein by reference. Silicone gel systems based on alternative cure techniques such as peroxide, UV light, and high energy radiation may also be used. Cure may be effected at ambient temperature or upon heating.

Alternatively, gel materials may be based on materials other than silicone, such as gels made from polyurethanes, polyureas, and anhydride-containing polymers.

Especially preferred are soft, tough, tacky, high elongation silicone gels that exhibit good stress relaxation and reduced fluid exudation. Exudation of extender fluid from the gel material (also referred to as fluid migration or bleed-out) is undesirable because it contaminates the surrounding environment with a thin liquid film.

A low-exudation silicone gel can fabricated by the chain extension of a divinyl silicone material in the presence of a cross-linker and a chain extender to create a high molecular weight sol, such that the weight average molecular weight ($M_w$) of the extractable fluid is at least 100,000 g/mol. (The extractable fluid consists of the sol and nonreactive diluent present in the formulation, if any.) The gel material is preferably fabricated with 0 to 40 weight % added inert extender diluent. An alternative synthetic method is to use a diluent with $M_w$ of at least 100,000 g/mol, but then the initial (uncured) viscosity is greater than 50,000 cP, which may make filling the base more difficult. Generally, these silicone gels preferably have a hardness of 10 to 1,000 g (more preferably 10 to 500 g), a tack of 5 to 250 g, an ultimate elongation of greater than 500%, and a stress relaxation of 20 to 95%. Preferably, the tensile strength of the cured gel material will not exceed about 150 psi, to permit the expansion process to take place.

Microspheres are available under the tradename Expancel™ from Akzo Nobel (Sweden), in several grades with expansion temperatures ranging from 80 to 150° C. The microspheres may be viewed as spheres filled with isobutane, which causes the microspheres to expand upon heating to the expansion temperature. Generally, the expansion temperature is determined by the composition of the polymer which forms the microsphere walls. The lowest temperature expanding microspheres (grade 820) have a composition of roughly 80% vinylidene chloride and 20% acrylonitrile. An intermediate-temperature grade (551) comprises 50/50 vinylidene chloride and acrylonitrile. A 120° C.—expanding grade (091) contains over 90% acrylonitrile and no vinylidene chloride. Yet another grade (051) expands around 110° C. The particle size of unexpanded microspheres ranges from 3 to 50 μm, with an average diameter of 10 to 17 μm. After expansion, they range in size from 10 to 200 μm, with an average diameter of 50 to 60 μm.

The microspheres may be present in an amount of between about 1 and about 40 weight %, preferably between about 9 and about 20 weight %, based on the combined weight of microspheres and gel material. A loading of 1 wt % of microspheres converts to approximately 30 volume % of microspheres after expansion and a loading of 40 weight % of microspheres converts to approximately 95 volume % of microspheres after expansion. It should be noted that the conversions will depend on the physical characteristics of the gel material and that, even for the same gel material, the expanded volume % is not linearly related to the weight %.

A small amount of fumed silica or surface treated fumed silica (between about 0.5 and about 1.0 weight %, based on total amount of gel, microspheres and fumed silica) can also be added to the formulation to prevent phase separation of the microspheres prior to the curing step.

In addition to the microspheres, the gel material may include fillers and additives, such as fumed silica (e.g., Cab-o-Sil), pigments, carbon black, thermally conductive particulate fillers (e.g., aluminum oxide (alumina), silicon carbide, zinc oxide, aluminum nitride, ferric oxide, beryllium oxide, titanium dioxide, magnesium oxide, boron nitride, and the like), stabilizers, anti-oxidants, coupling agents; rheological additives such as surface treated fumed silica, organically modified clays, hydrogenated castor oil, and the like; polyhedralorganosilsesquioxane (POSS) macromers and POSS-containing polymers; electrically conductive fillers (metal powders, metal coated oxide powders, metal fibers, metal flakes, and the like), etc.

Because the unexpanded gel material is solid and not a liquid, liquid processing equipment is not necessary for its installation. The material can be formed (extrusion, die-cutting, molding, etc.) to a desired shape and fixtured into the final application. Compared to liquid materials, it has better storage stability and is not susceptible to cure poisoning during storage (being already cured). Because the gel material is a non-crystalline cross-linked composition, there is no phase change (e.g., melting of crystallites) so the volume expansion is the result of only expansion of the microspheres. Without a phase change, the material does not display a reduction in volume upon cooling, as is often the case with thermoplastic materials, which often experience a volume change upon cooling (crystallization). Lastly, because the gel material is crosslinked, it is resistant to flow during the high temperature expansion process, unlike uncrosslinked solids and reactive liquids, which can flow and cause slumping during expansion.

Expanded gel materials of the present invention can be used in the sealing, encapsulation, vibration damping/isolation, and other applications in which gel materials are typically used. The expanded gel materials offer an extra advantage of reduction in material weight and cost, for applications where such considerations are important. A specific example of an application of an expanded gel material according to the present invention is found in the co-pending application of Rinde et al., U.S. application Ser. No. 09/285,407, entitled "Sealing System for Acoustic Wave Touchscreens," filed Apr. 2, 1999, incorporated herein by reference.

The invention can be understood further by reference to the following examples, which are provided by way of illustration and not of limitation.

EXAMPLE 1

An addition cure silicone gel composition was prepared in the following manner: Part A was prepared by combining 100 parts by weight vinyl terminated PDMS ($M_w$=62,700; vinyl content=0.03–0.06 eq/kg), 0.08 part platinum-divinyltetramethyldisiloxane complex (2–3% Pt concentration) and 0.05 parts tetravinyltetramethylcyclotetrasiloxane in a beaker followed by mixing for 3 min with an overhead mixer. Part B was prepared by combining 88.6 parts vinyl terminated PDMS ($M_w$=62,700, vinyl content=0.03–0.06 eq/kg), 9.4 parts methylhydrodimethylsiloxane copolymer ($M_w$=50,000; hydride content =0.5–1.5 mol. %) and 1.8 parts hydride terminated PDMS ($M_w$=500; hydride content=0.3–0.5 wt. %) in a beaker followed by mixing for 3 min. with an overhead mixer. When mixed 1:1 and cured at 90° C. for 30 min., the resulting gel displayed a Voland hardness of 30 g, tensile strength of 4 psi and ultimate elongation of 2,200%. An expandable gel formulation was prepared by combining 25 parts of Part A, 25 parts of Part B, and 5 parts of Expancel 091-80-DU unexpanded microspheres in a beaker followed by mixing for 5 min with an overhead mixer. Disks with dimensions of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table following.

|  | cured at 90° C. | expanded at 150° C. |
| --- | --- | --- |
| weight % silicone | 91% | |
| weight % Expancel | 9% | |
| Voland hardness | 19 g | 112 g |
| diameter | 13.0 mm | 20.3 mm |
| length | 6.5 mm | 10.7 mm |
| density | 0.93 g/cc | 0.23 g/cc |
| volume expansion | — | 302% |

EXAMPLE 2

An addition cure silicone gel composition was prepared in the following manner: Part A was prepared by combining 100 parts by weight vinyl terminated PDMS ($M_w$=62,700; vinyl content=0.03–0.06 eq/kg), 0.08 parts platinum-divinyltetramethyldisiloxane complex (2–3% Pt concentration) and 0.05 parts tetravinyltetramethylcyclotetrasiloxane in a beaker followed by mixing for 3 min. with an overhead mixer. Part B was prepared by combining 88.9 parts vinyl terminated PDMS ($M_w$=62,700, vinyl content=0.03–0.06 eq/kg), 11 parts methylhydrodimethylsiloxane copolymer ($M_w$=50,000; hydride content =0.5–1.5 mol. %) and 2.1 parts hydride terminated PDMS ($M_w$=500; hydride content=0.3–0.5 wt. %) in a beaker followed by mixing for 3 min. with an overhead mixer. When mixed 1:1 and cured at 90° C. for 30 min., the resulting gel displays a Voland hardness of 240 g, tensile strength of 13 psi and ultimate elongation of 1,300%. An expandable gel formulation was prepared by combining 25 parts of Part A, 25 parts of Part B, and 5 parts of Expancel 091-80-DU unexpanded microspheres in a beaker followed by mixing for 5 min. with an overhead mixer. Disks with dimension of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table following:

|  | cured @ 90° C. | expanded @ 150° C. |
| --- | --- | --- |
| weight % silicone | 91% | |
| weight % Expancel | 9% | |
| Voland hardness | 220 g | 490 g |
| diameter | 13.0 mm | 19.8 mm |
| length | 6.5 mm | 10.0 mm |
| density | 0.93 g/cc | 0.26 g/cc |
| volume expansion | — | 256% |

Another expandable gel with a higher loading level of unexpanded microspheres was prepared from the same Part A and Part B by mixing 10 parts of Expancel 091-80-DU, 20 parts of Part A and 20 parts of Part B followed by mixing for 5 min. with an overhead mixer. Disks with dimension of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table below.

|  | cured @ 90° C. | expanded @ 150° C. |
| --- | --- | --- |
| weight % silicone | 80% | |
| weight % Expancel | 20% | |
| Voland hardness | 150 g | 520 g |
| diameter | 13.0 mm | 23.9 mm |
| length | 6.5 mm | 13.5 mm |
| density | 0.93 g/cc | 0.13 g/cc |
| volume expansion | — | 602% |

Figure 2:
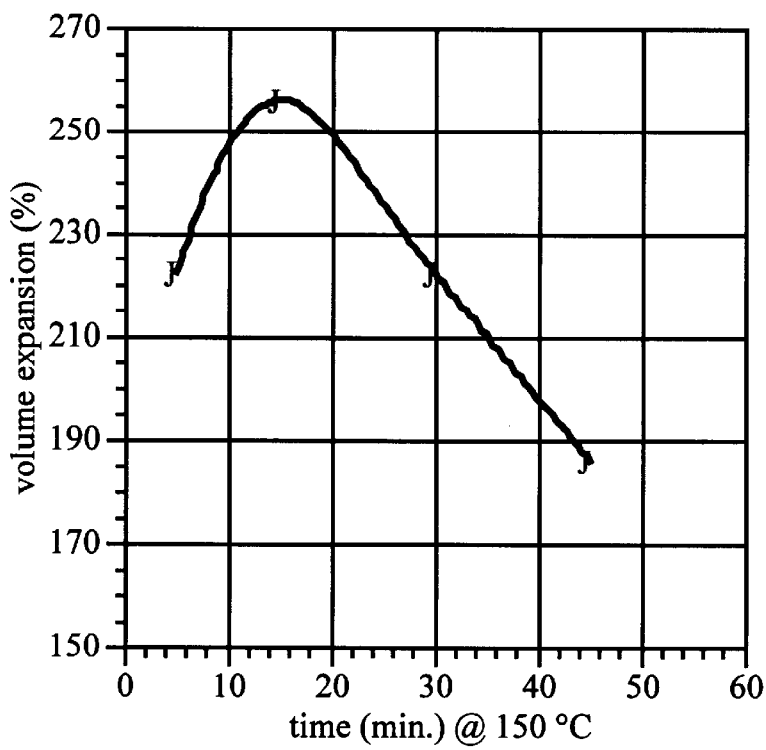

An optimum expansion time of 15 min. was determined by periodically removing samples from an oven at 150° C. and measuring the volume expansion as a function of time. This data also shows that the silicone gel samples, once expanded, are only stable at temperatures below the softening temperature of the Expancel microspheres. The data is shown in FIG. 2.

EXAMPLE 3

An addition cure silicone gel composition was prepared in the following manner: Part A was prepared by combining 100 parts by weight vinyl terminated PDMS ($M_w$=62,700; vinyl content 0.03–0.06 eq/kg), 0.08 parts platinum-divinyltetramethyldisiloxane complex (2–3% Pt concentration) and 0.05 parts tetravinyltetramethylcyclotetrasiloxane in a beaker followed by mixing for 3 min. with an overhead mixer. Part B was prepared by combining 77.5 parts vinyl terminated PDMS ($M_w$=62,700, vinyl content=0.03–0.06 eq/kg), 21 parts methylhydrodimethylsiloxane copolymer ($M_w$=50,000; hydride content =0.5–1.5 mol. %) and 1.5 parts hydride terminated PDMS ($M_w$=500; hydride content=0.3–0.5 wt. %) in a beaker followed by mixing for 3 min. with an overhead mixer. When mixed 1:1 and cured at 90° C. for 30 min., the resulting gel displays a Voland hardness of 340 g, tensile strength of 14 psi and ultimate elongation of 600%. An expandable gel formulation was prepared by combining 25 parts of Part A, 25 parts of Part B, and 5 part of Expancel 091-80-DU unexpanded microspheres in a beaker followed by mixing for 5 min. with an overhead mixer. Disks with dimensions of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table below.

|  | cured at 90° C. | expanded at 150° C. |
| --- | --- | --- |
| weight % silicone | 91% | |
| weight % Expancel | 9% | |
| Voland hardness | 300 g | 545 g |
| diameter | 13.0 mm | 19.3 mm |
| length | 6.5 mm | 9.9 mm |
| density | 0.93 g/cc | 0.28 g/cc |
| volume expansion | — | 237% |

EXAMPLE 4

An addition cure silicone composition was prepared in the following manner: Part A was prepared by combining 100 parts by weight vinyl terminated PDMS ($M_w$=62,700; vinyl content=0.03–0.06 eq/kg), 0.08 part platinum-divinyltetramethyldisiloxane complex (2–3% Pt concentration) and 0.05 parts tetravinyltetramethylcyclotetrasiloxane in a beaker followed by mixing for 3 min. with an overhead mixer. Part B was prepared by combining 50 parts vinyl terminated PDMS ($M_w$=62,700, vinyl content=0.03–0.06 eq/kg), 49.5 parts methylhydrodimethylsiloxane copolymer ($M_w$=50,000; hydride content=0.5–1.5 mol. %) and 0.5 parts hydride terminated PDMS ($M_w$=500; hydride content=0.3–0.5 wt. %) in a beaker followed by mixing for 3 min. with an overhead mixer. When mixed 1:1 and cured at 90° C. for 30 min., the resulting gel displays a Voland hardness of 1300 g, tensile strength of 21 psi and ultimate elongation of 120%. An expandable gel formulation was prepared by combining 25 parts of Part A, 25 part of Part B, and 5 part of Expancel 091-80-DU unexpanded microspheres in a beaker followed by mixing for 5 min. with an overhead mixer. Disks with dimensions of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table below.

|  | cured at 90° C. | expanded at 150° C. |
| --- | --- | --- |
| weight % silicone | 91% | |
| weight % Expancel | 9% | |
| Voland hardness | 1175 g | 859 g |
| diameter | 13.0 mm | 18.0 mm |
| length | 6.5 mm | 9.2 mm |
| density | 0.93 g/cc | 0.34 g/cc |
| volume expansion | — | 171% |

Another expandable material with a higher loading level of unexpanded microspheres was prepared from the same Part A and Part B by mixing 10 parts of Expancel 091-80-DU, 20 parts of Part A and 20 parts of Part B followed by mixing for 5 min. with an overhead mixer. Disks with dimensions of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table below.

|  | cured @ 90° C. | expanded @ 150° C. |
| --- | --- | --- |
| weight % silicone | 91% | |
| weight % Expancel | 9% | |
| Voland hardness | 435 g | 540 g |
| diameter | 13.0 mm | 23.4 mm |
| length | 6.5 mm | 12.4 mm |
| density | 0.93 g/cc | 0.15 g/cc |
| volume expansion | — | 518% |

EXAMPLE 5

An addition cure silicone composition was prepared in the following manner: Part A was prepared by combining 100 parts by weight vinyl terminated PDMS ($M_w$=19,500; vinyl content=0.07–0.11 eq/kg), 0.08 parts platinum-divinyltetramethyldisiloxane complex (2–3% Pt concentration) and 0.05 parts tetravinyltetramethylcyclotetrasiloxane in a beaker followed by mixing for 3 min. with an overhead mixer. Part B was prepared by combining 10.8 parts vinyl terminated PDMS ($M_w$=19,500, vinyl content=0.07–0.11 eq/kg) and 89.2 parts methylhydrodimethylsiloxane copolymer ($M_w$=50,000; hydride content=0.5–1.5 mol. %) in a beaker followed by mixing for 3 min. with an overhead mixer. When mixed 1:1 and cured at 90° C. for 30 min., the resulting gel displays a Voland hardness of 860 g, tensile strength of 4 psi and ultimate elongation of 100%. An expandable gel formulation was prepared by combining 25 parts of Part A, 25 part of Part B, and 5 part of Expancel 091-80-DU unexpanded microspheres in a beaker followed by mixing for 5 min. with an overhead mixer. Disks with dimensions of 13 mm diameter×6.5 mm thickness were prepared by pouring the mixed material into metal molds with the appropriately sized cut-out. The material was cured at 90° C., 30 min. Expansion of the material was performed by heating the material at 150° C. for 15 min. The unexpanded and expanded materials properties are shown in the table below.

|  | cured @ 90° C. | expanded @ 150° C. |
| --- | --- | --- |
| weight % silicone | 91% | |
| weight % Expancel | 9% | |
| Voland hardness | 740 g | 530 g |
| diameter | 13.0 mm | 18.2 mm |
| length | 6.5 mm | 9.2 mm |
| density | 0.93 g/cc | 0.33 g/cc |
| volume expansion | — | 180% |

EXAMPLE 6

A silicone rubber composite containing unexpanded microspheres was prepared in the following manner: 90 parts by weight RTV 118, a one-part RTV rubber material with a tensile strength of 325 psi and ultimate elongation of 325% available from GE Silicones, and 10 parts Expancel 091-80-DU unexpanded microspheres were combined in a beaker and mixed for 5 min. with an overhead mixer. Disks with dimensions of approximately 13 mm diameter×5 mm thickness were prepared by pouring the mixed material into metal molds with the appropriately sized cut-out. The material was cured at room temperature for 7 days. The resulting rubber displays a Voland hardness of 4220 g. The material was then heated at 150° C. for 15 min. Virtually no expansion was observed. The results are summarized in the table below.

|  | 25° C. cure | 150° C. expansion |
| --- | --- | --- |
| weight % RTV 118 | 90% | |
| weight % Expancel | 10% | |
| Voland hardness | 4220 g | 4220 g |
| diameter | 12.8 mm | 12.8 mm |
| length | 5.1 mm | 5.2 mm |
| volume expansion | — | 2% |

Figure 3:
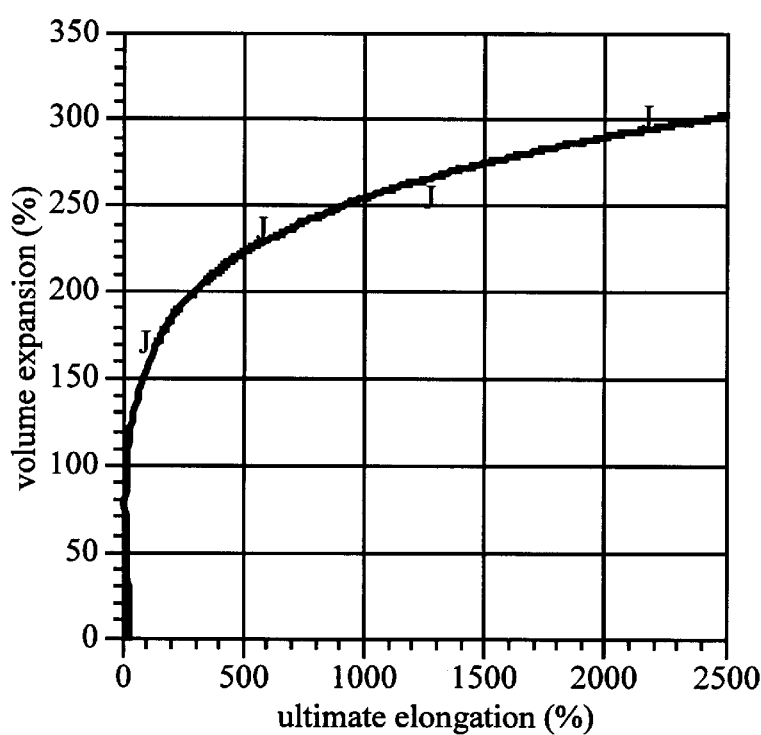
Figure 4:
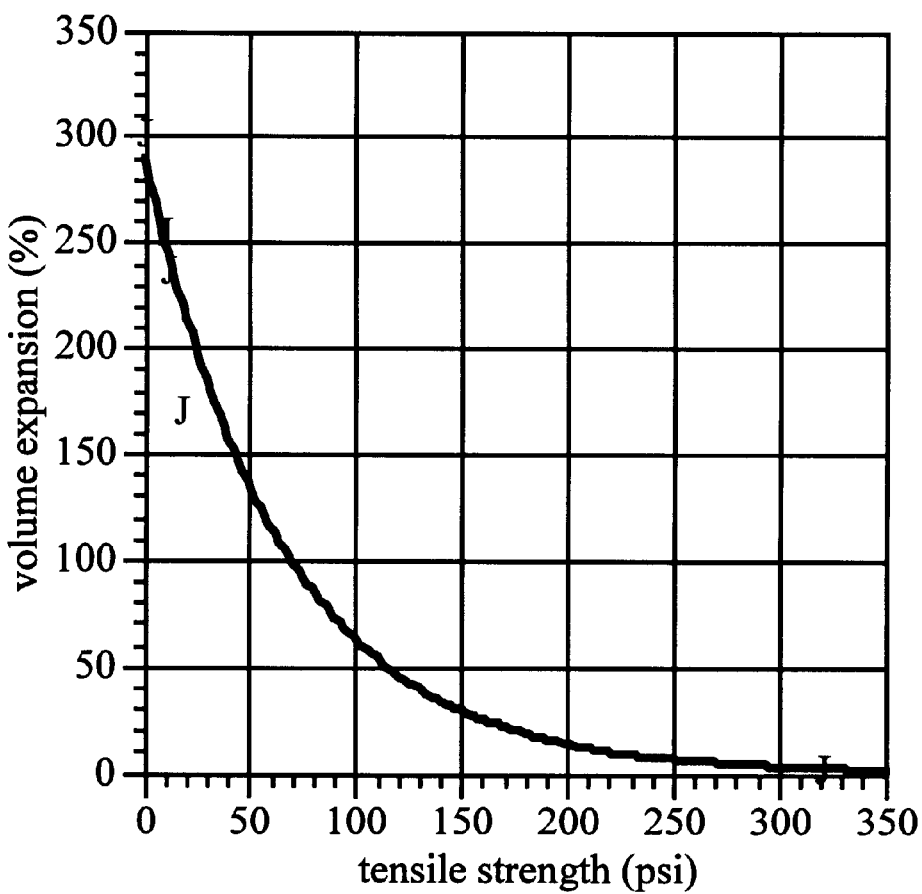

From the above examples, plots of volume expansion versus ultimate elongation and volume expansion versus tensile strength were prepared (FIGS. 3 and 4, respectively). From these data, we observed that the ultimate strength of the elastomeric material is the key property in establishing maximum volume expansion with ultimate elongation playing a less important role.

Figure 5:
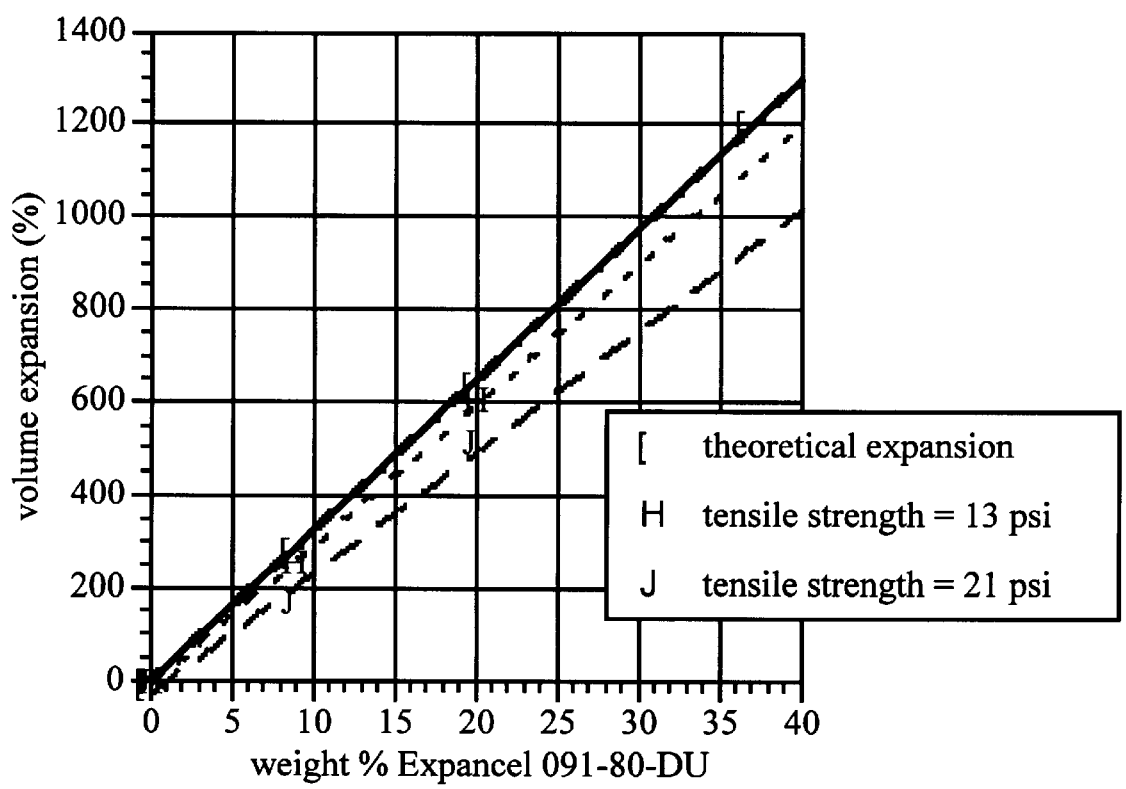

As expected, increasing the loading level of expandable microspheres increases the final volume expansion of the material. A plot of expansion versus loading level is shown in FIG. 5. Although over 40 weight % microspheres can be added to a thermosetting elastomer material, there are practical limitation, as this high loading results in a material with greater than 95% void volume after expansion. Because of the high void volume, the material has no cohesive or mechanical strength and cannot be handled as an unsupported material. Materials with high microsphere loading are most useful for filling confined geometries where an excess of expansion is desired to guarantee complete filling of the confined volume.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A method of expanding a gel material, comprising the steps of:
    (a) providing a mixture comprising a curable gel precursor material and a plurality of heat-expandable microspheres, the gel precursor material being curable into a noncrystalline crosslinked gel material having a tensile strength of no greater than about 150 psi upon subjection to a pre-determined curing condition and the microspheres being expandable upon heating to a expansion temperature, the pre-determined curing condition not causing the expansion of the microspheres;
    (b) subjecting the mixture to the curing condition to cure the gel precursor material into a gel material which
        (1) has a tensile strength of no greater than about 150 psi,
        (2) comprises a crosslinked silicone gel, and
        (3) contains the microspheres; and
    (c) heating the crosslinked gel material containing the microspheres to the expansion temperature, causing the microspheres to expand and thereby also causing the expansion of the gel material.

2. A method according to claim 1, wherein the pre-determined curing condition is heating to a curing temperature lower than the expansion temperature.

3. A method according to claim 1, wherein the curing condition is irradiation with ultraviolet light.

4. A method according to claim 1, wherein the curing condition is allowing a room temperature curing gel precursor material to cure under the influence of a catalyst.

5. A method according to claim 1, wherein the microspheres are present in an amount of between about 1 and about 40 weight %.

6. A method according to claim 1, wherein the microspheres are present in an amount of between about 9 and about 20 weight %.

7. A method according to claim 1, wherein the expanding of the gel material is effected by heating to a temperature between about 80 and about 150° C.

8. A method according to claim 1, wherein the mixture comprising the curable gel precursor and the plurality of heat-expandable microspheres further comprises between about 0.5 and about 1.0 weight % fumed silica.

* * * * *